(12) United States Patent
Ioannidis et al.

(10) Patent No.: US 11,836,264 B1
(45) Date of Patent: Dec. 5, 2023

(54) END-TO-END TAGGING AND TRACKING OF EVENT SIGNALS SUBJECT TO PRIVACY POLICIES

(71) Applicant: Amazon Technologies, Inc., Seattle, WA (US)

(72) Inventors: Ioannis Ioannidis, Longmont, CO (US); Monika Kofler, Boulder, CO (US); David Mozealous, Golden, CO (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 17/463,762

(22) Filed: Sep. 1, 2021

(51) Int. Cl.
*G06F 21/62* (2013.01)

(52) U.S. Cl.
CPC .................. *G06F 21/6209* (2013.01)

(58) Field of Classification Search
CPC .................................................. G06F 21/6209
See application file for complete search history.

(56) References Cited

U.S. PATENT DOCUMENTS

| | | | | |
|---|---|---|---|---|
| 9,811,669 | B1* | 11/2017 | Todd | G06T 11/20 |
| 10,025,878 | B1* | 7/2018 | Lefever | G06F 16/9024 |
| 11,580,253 | B1* | 2/2023 | Lyons | G06F 21/6245 |
| 2019/0163928 | A1* | 5/2019 | Hankeln | G06F 16/11 |
| 2020/0097476 | A1* | 3/2020 | Tran | G06Q 30/01 |
| 2021/0090126 | A1* | 3/2021 | Schobeiri | H04L 67/53 |
| 2021/0216521 | A1* | 7/2021 | Jia | G06F 16/367 |
| 2021/0319130 | A1* | 10/2021 | Huang | G06T 3/40 |
| 2022/0050915 | A1* | 2/2022 | Hsy | G06F 9/547 |

* cited by examiner

*Primary Examiner* — Vance M Little
(74) *Attorney, Agent, or Firm* — Eversheds Sutherland (US) LLP

(57) ABSTRACT

Systems, devices, and methods are provided for end-to-end tagging and tracking of event signals subject to privacy policies. User events comprising event source data may be collected. A user may be associated with a segment, and the segment may be mapped to data lineage information corresponding to the events that were used to determine that the user is in segment. A segment cache may be generated comprising portions that correspond to different data lineages subject to different privacy policies. Bid requests may be received and processed according to applicable privacy policies.

20 Claims, 10 Drawing Sheets

END-TO-END TAGGING AND TRACKING OF EVENT SIGNALS SUBJECT TO PRIVACY POLICIES

BACKGROUND

In various embodiments, there is a need to attach data lineage semantics to behavioral segments and data (e.g., geodata) so that users can be targeted based on segments whose lineage is allowed for a bid supply source, according to one or more applicable privacy policies that may be determined based on the bid supply source. When an event is emitted, it may be subject to certain privacy policies. For example, if an event is emitted by an application of an operating system, there may be privacy policies that restrict how the data collected from within and without the operating system can be used across supply sources. Furthermore, different operating systems, versions of operating systems, applications, etc. may have their own privacy policies that may or may not be applicable under various circumstances. Properly evaluating whether and how data can be used in downstream processes may be difficult to implement.

Figure 1:
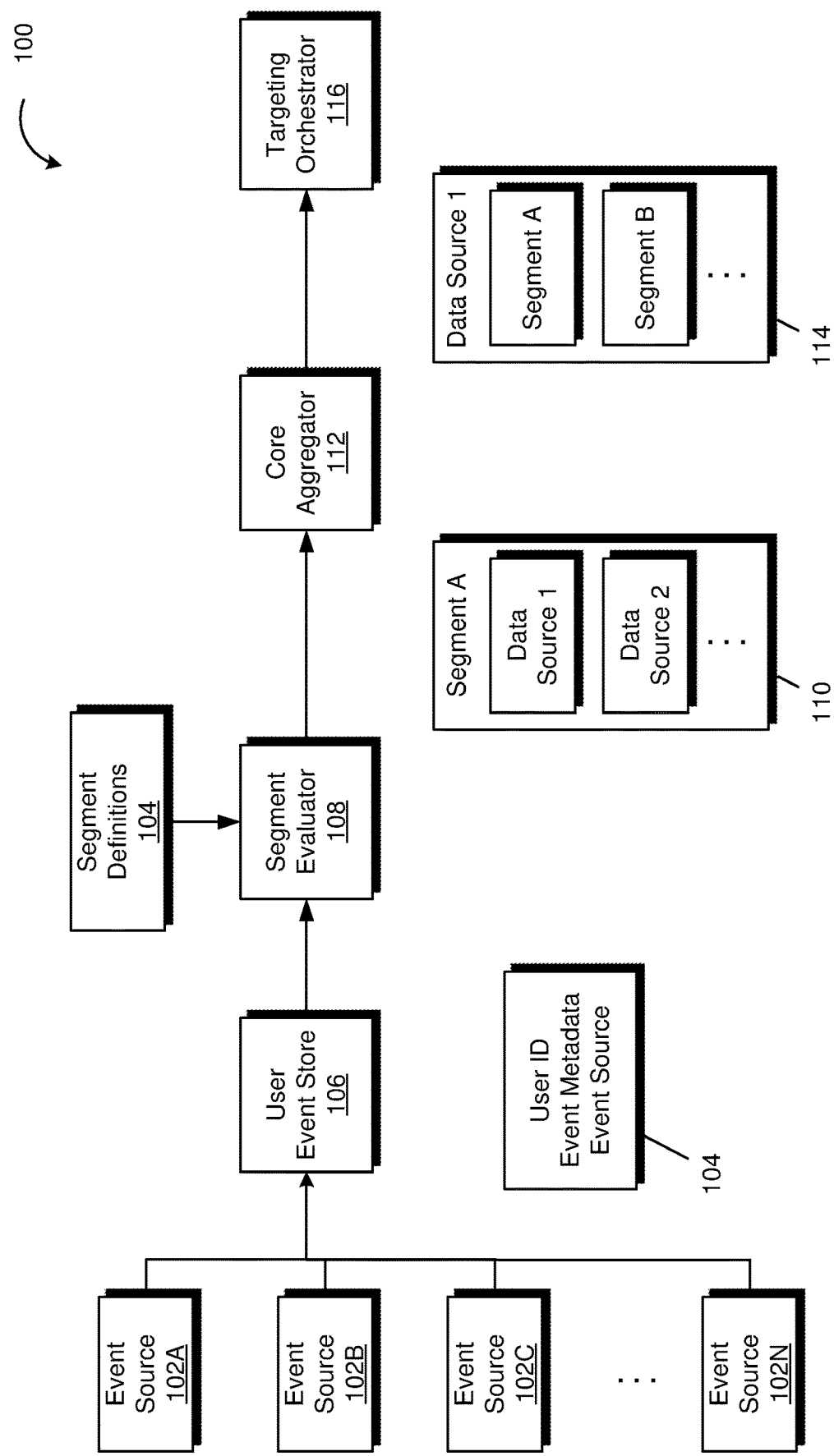
FIG. 1 illustrates a computing environment for implementing end-to-end tagging and tracking of event signals subject to privacy policies, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for end-to-end tagging and tracking of event signals subject to privacy policies.

In various embodiments, there is a need to attach data lineage semantics to behavioral segments and data (e.g., geodata) so that users can be targeted based on segments whose lineage is allowed for a bid supply source, according to one or more applicable privacy policies that may be determined based on the bid supply source. When an event is emitted, it may be subject to certain privacy policies. For example, if an event is emitted by an application of an operating system, there may be privacy policies that restrict how the data collected from within and without the operating system can be used across supply sources. Furthermore, different operating systems, versions of operating systems, applications, etc. may have their own privacy policies that may or may not be applicable under various circumstances. Techniques described herein may be used to implement systems and methods for end-to-end tagging and tracking of event signals subject to privacy policies and evaluating whether and how data can be used in downstream processes.

In various embodiments, techniques described herein may be used to implement end-to-end tagging and tracking of event signals subject to privacy policies. Note that not all event signals may be subject to privacy policies, but such systems may be designed to accommodate various privacy policies that may or may not be applicable under various circumstances.

Privacy policies may be specified by various components within a computing environment, including but not limited to an operating system running on a machine. For example, a mobile operating system or specific version of a mobile operating system may restrict the manner in which event signals generated from that mobile operating system may be used for advertising and targeted purposes unless user consent is received. For example, a privacy policy may specify that an event signal may be used for advertising and targeting purposes on first-party properties but not third-party properties. Examples of first-party properties may include mobile applications and websites that are owned or controlled by the same entity or organization. Conversely, third-party properties may include mobile applications and websites that are separately owned.

Accordingly, there are challenges involved in properly applying privacy policies. Traditionally, the common pattern is to drop entirely signals generated from event sources that are subject to privacy policies that restrict the use of such data. In contrast, techniques described herein may be used to tag and track event sources to more intelligently determine how to identify whether users can be identified as belonging to a specific segment.

For example, if a user purchases a bottle of Acme Soda using a mobile application running on a mobile operating system, event data may be generated for the purchase. Event data may include various information, such as the action performed (e.g., purchase), the product purchased, when the action occurred, and metadata associated with the event, such as the mobile application that was used to make the purchase, the mobile operating system version numbers (e.g., major and/or minor version numbers), and so forth. The mobile operating system or other components involved in the event may have privacy policies that the event data is subjected to—for example, the mobile operating system may have, as a condition of use, a privacy policy that restricts the use of a "purchase Acme Soda" signal only to first-party (1P) sources from mobile devices running specific versions of the operating system devices. However, if a user buys a bottle of Acme Soda using a mobile application of an operating system and then also buys a bottle of Acme Soda from a desktop computer system that does not have privacy policies that restrict the use of event data, then it may be permissible to target the user based on the "purchase Acme Soda" signal in all supply sources based on the second event, which is unrestricted.

Determining data lineage and attribution may be used to determine how event data can be used across various dimensions and in various bid request contexts. In various embodiments, determining whether a user is in market for a segment includes data lineage information for the event source. For example, if a user is determined to be in market for shoes, data lineage information may be used to annotate whether the data was sourced from a restricted source. If the event data originated from an unrestricted data source, it may be suitable for use across any suitable segment. However, if the event data originated from a restricted source, such as from a mobile application running on a mobile operating system, there may be applicable privacy policies that restrict the use of how event data collected on its platform may be used to target users.

When data is ingested, information may be packaged into audiences and may be vended out as part of an advertising platform. Privacy policies may be applied to ensure that when a bid request is received, that only the audiences in compliance with the applicable privacy policies are used to generate bid responses. Techniques described herein can be used to apply any and all applicable privacy policies—for example, a first mobile operating system may have a first privacy policy definition that is applicable to events generated from applications running on the first mobile operating system and a second mobile operating system may have a second privacy policy definition that is applicable to other events generated from other applications running on the second mobile operating system.

Accordingly, one aspect described herein relates to data lineage tracking and tagging at the point of event origination. When events are emitted, generated, or otherwise determined, metadata relating to the event data source may be collected and persisted in an event data store so that downstream processes that aggregate event data at the user-level are able to retain the data lineage information and track how it was determined that a user is in market for a product or service.

Three different models of data lineage may be described herein, and utilized in the implementation of at least one embodiment. Event-level data lineage information may include information relating to the origins of a signal, including but not limited to the device type, device identifier, device operating system, versioning information, and so forth. Audience-level data lineage information may include high-level description of which computing environments event data may be used—for example, events may be may be usable only by a particular mobile application (e.g., the application from which the event originated), a particular mobile operating system or version, and so forth. Bid-level data lineage information may refer to when ads are served, and may include granular information regarding the bid request context, such as the device type, device identifier, device operating system, versioning information, and so forth.

Event sources may originate from various computing environments. For example, event data may be generated within a mobile application, web browser, or other suitable means. Event sources may be annotated with granular information regarding the source of the event. For example, if a user purchases an item through a web browser, information regarding the browser, operating system, versioning information thereof, and so forth may be recorded as event metadata.

Users may be evaluated based on aggregate history of events, summaries of users' profiles and sets of audiences may be determined based on such aggregate information. User agent data may be attached to event and conform to a Subject-Verb-Object syntax. Modifiers may also be attached. An example statement according to such syntax may be "User A purchased A at time B, through user agent C, from location D." Audience-level information may be generated based on more generalized statements to represent broader audiences for advertising. For example, an advertiser may submit bid requests for a set of users that has purchased shoes in the past 60 days. User-level data may be summarized to determine whether or not a user is in segment. In some cases, privacy policies may exclude certain events that would indicate that a user is in segment. For example, a mobile operating system may restrict the use of events generated on its platform to only $1^{st}$ party user, such that if a bid request is received from a $3^{rd}$ party, event data emitted from a mobile application running on that operating system may be omitted from consideration when determining whether a user is in segment. Conversely, if a $1^{st}$ party bid request is received, the event data may be used, resulting in potentially different segmentation based on who the bidder is.

Audience-level information may be aggregated across longer time periods, different product categories, and so forth. While event-level information may be granular and specific to a particular user action, audience-level information can potentially include multiple events from multiple different data sources. For example, audience-level information may be used to determine whether a user has browsed for shoes over the past 60 days. Membership in such a set may be determined based on data lineage information indicating whether set membership can be determined based on information that is not prohibited based on applicable privacy policies.

In various embodiments, bid response decorations with behavioral segments are made to be a function of user ID and bid context (e.g., supply sources). This may be in contrast to existing system that are only a function of user ID and do not take into account bid context. Techniques described herein may rely on the concept that segments are published from an evaluation pipeline decorated with a set of data sources (e.g., data lineage information) and an audience distribution layer caches segment payload indexed by data source. At bid time, a target orchestrator may resolve supply source information to determine a subset of segments that is allowed to be used for the bid request, according to any applicable privacy policies.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 for implementing end-to-end tagging and tracking of event signals subject to privacy policies, in accordance with one or more example embodiments of the present disclosure. In at least one embodiment, computing environment 100 is implemented in the context of a computing resource service provider, such as a cloud service provider. Various techniques described in connection with FIGS. 2-10 may be implemented in the context of FIG. 1.

Computing environment 100 depicts an architecture for implementing end-to-end tagging and tracking of event signals subject to privacy policies. In at least one embodiment, event ingestion occurs when events are emitted from event sources. Event sources 102 may refer to online or offline event sources. Online event sources may refer to event sources that are connected with computer-based actions, such as browsing a website or mobile application. Offline event sources may refer to actions performed offline, such as if a user makes a purchase at a physical (e.g., brick and mortar) store location. Offline actions may be recorded electronically as events and stored in user event store, nevertheless.

Event sources 102A-N may refer to various source that may be used to generate event signals. Events may include granular information regarding a user id, event metadata, and may be tagged with an event data source or other data lineage information. For example, event data may include various information, such as the action performed (e.g., purchase), the product purchased, when the action occurred, and metadata associated with the event, such as the mobile application that was used to make the purchase, the mobile operating system version number (e.g., major and/or minor version numbers), and so forth. In some cases, data lineage information is included as part of event metadata, but in other cases, it may be encoded separate.

Events from multiple data sources may be aggregated and stored in user event store 106. User event store 106 may be implemented as a persistent data store, such as a database system comprising records and fields. An event may be saved as a record in a database system. For example, a user may browse for a product on a mobile application of a first mobile operating system on a first mobile device, and then browse for the same product on a desktop browser of a desktop operating system on a second device. Events may be collected from both of these sources indicating that the product was browsed for on the mobile application (and may be subject to a privacy policy of the first mobile operating system) and that the product was also browsed for from a browser on a desktop operating system. Different privacy policies may apply to how these events may be used by downstream consumers.

Segment evaluator 108 may refer to hardware, software, or a combination thereof, that uses user history stored in user event store 106 and segment definitions 104 to generate a segment cache. Segment evaluator 108 may include logic to retrieve user events from a user event store, and may retrieve segment definitions from a segment definitions store. Segment evaluator 108 may have business logic to generate segment cache and tag the segments with data lineage information indicating how segmentation was determined. Segment definitions may be dynamically added, updated, removed, etc. In various embodiments, segment evaluator 108 automatically re-creates or updates a segment cache in response to changes to segment definitions. In this way, when new privacy policies are imposed on the use of event data, the segment cache may be automatically updated to reflect segmentation based on the new privacy policies being imposed on the event data. Segment evaluator may generate, for a user, a first data structure 110 comprising a plurality of segments that a user belongs to. Each segment may be mapped to one or more data sources. A data source being mapped to a segment indicates that an event from that data source can be used to determine the user is in the segment. For example, as depicted in FIG. 1, first data structure indicates that there are at least two events that may be used to determine the user is in market for "Segment A"— a first event from "Data Source 1" and a second event from "Data Source 2". Events from different data sources may be subject to different privacy policies and may be usable in different contexts for determining how to process bid requests.

Core aggregator 112 may be used to re-organize event data. In various embodiments, core aggregator may be used to generate second data structure 114. Second data structure 114 may, for a user, comprise a plurality of data sources, wherein each data source maps to one or more segments. Each data source of second data structure 114 may correspond to a grouping of events or event sources that are subject to the same set of privacy policies. For example, if events from a first mobile operating system are subject to a privacy policy, but events from a second mobile operating system and a desktop operating system are not subject to any privacy policies, then there may be two data source groupings. As depicted in FIG. 1, events from "Data Source 1" may be used to determine that a user is in "Segment A" and "Segment B." Segment cache may be partitioned by data source.

Targeting orchestrator 116 may be a component implemented as hardware, software, or a combination thereof. Targeting orchestrator 116 may retrieve behavioral segment payloads from segment cache, apply data lineage-to-supply source mapping rules, factoring in user consent status, decorate bids with privacy information that all bidders can use (e.g., opt-out status, impression-unique tokens), and combinations thereof.

Figure 2:
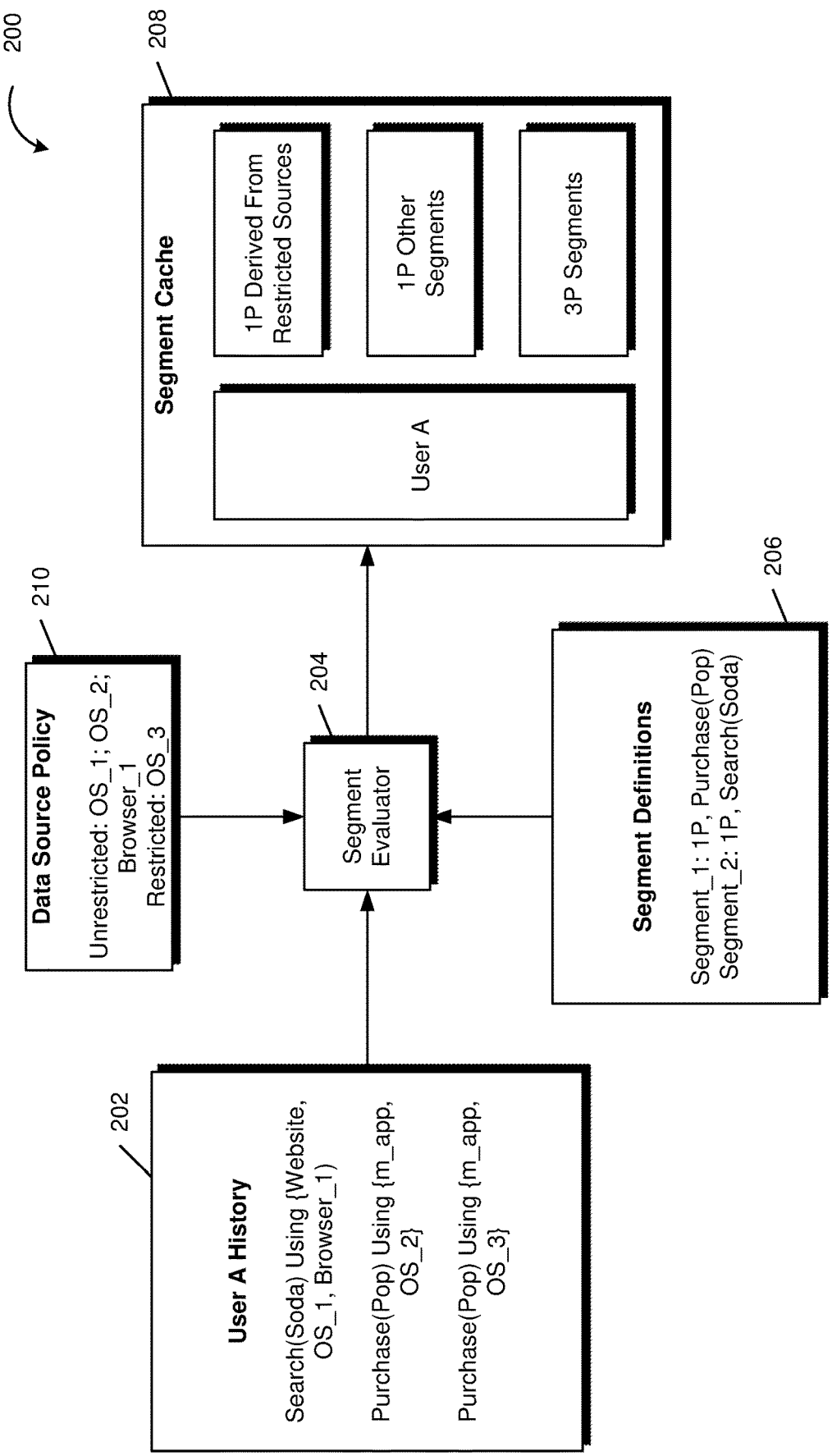
FIG. 2 illustrates a computing environment in which a segment cache may be implemented, in accordance with one or more example embodiments of the present disclosure.

FIG. 2 illustrates a computing environment 200 in which a segment cache may be implemented, in accordance with one or more example embodiments of the present disclosure. Techniques described in connection with FIG. 3 may be practiced in the context of embodiments described elsewhere, such as those discussed in connection with FIG. 1, FIG. 3, FIG. 8, FIG. 9, and FIG. 10.

User history 202 may refer to user events that are collected for a user. User history may be collected and persisted in user event store, such as those described in connection with FIG. 1 and FIG. 4, which may be used to perform event ingestion and decoration. For example, user history 202 may be encoded in a Subject-Verb-Object structure or syntax. In the case of a single user, the Subject portion of the structure may be implicit. For example, it may be assumed that in FIG. 2, the subject for User A's search history is simply User A. Accordingly, the illustrative event history for User A may include a first event corresponding to a computer-based search for "Soda" that User A performed using a website on a first operating system and browser that does not impose any privacy policies, a second event corresponding to a computer-based purchase for "Pop" that User A performed using a mobile application on a second operating system that also does not impose any privacy policies, and a third event corresponding to a computer-based purchase for "Pop" that User A performed using a mobile application on a third operating system that does have impose a privacy policy (e.g., it is "restricted"). Data source policy 210 information may be used to determine whether the use of event data is restricted or not. For example, a privacy policy associated with OS_3 may indicate that the use of any event data generated on OS_3 (e.g., applications running on an operating system) for advertising purposes is restricted. In some examples, the lack of a privacy policy being associated with an event context, such as application-level, operating system-level, hardware-level, etc. information may be used to determine that the use of events collected from such sources is unrestricted. In various embodiments, a privacy policy comprises a schema that defines when the privacy policy is applicable, which can be used to determine whether various use contexts are restricted or unrestricted, for example, as depicted in FIG. 2.

Segment evaluator 204 may refer to hardware, software, or a combination thereof, that uses user history 202 and segment definitions 206 to generate a segment cache 208. Segment evaluator 204 may include logic to retrieve user events from a user event store, and may retrieve segment definitions from a segment definitions store. Segment evaluator 204 may have business logic to generate segment cache and tag the segments with data lineage information indicating how segmentation was determined. Segment definitions may be dynamically added, updated, removed, etc. In various embodiments, segment evaluator 204 automatically re-creates or updates a segment cache in response to changes to segment definitions. In this way, when new privacy policies are imposed on the use of event data, the segment cache may be automatically updated to reflect segmentation based on the new privacy policies being imposed on the event data.

Segment definitions 206 may refer to rules that determine whether a user is in a segment. Segments may be generated based on various signals from various data sources. For example, a first segment may indicate that it is a first-party segment for purchases of "Pop". Segmentation may be based on a specific product, product category, and so forth. Segments may be more complex, for example, including a time-based restriction so that segmentation is only based on recent or "fresh" signals. As depicted in FIG. 2, different segments definitions may be specified to identify various audiences for which advertisements or other digital content may be served based on user activities performed online and/or offline.

Segment cache 208 may be generated for each of the segment definitions 206 based on user history 202. Segment definitions may be first-party or third-party. User history 202 may be analyzed to determine whether it is in segment based on the segment definitions provided. When an event of user history 202 is determined to satisfy a segment definition, segment evaluator 204 may associate the segment with the user. Additionally, the segment may be annotated with data source information of the event for which the in segment determination was made. For example, for Segment_1 illustrated in FIG. 1, segment evaluator may determine the first event in user history 202 does not meet the segment definition and continue to the next event. For the second event, it may be determined that Segment_1 is met, and that User A should be in segment based on the definition Segment_1. In addition to associating User A to Segment_1, the segmentation information may be further tagged or annotated with data source information, such as metadata relating to the event context, such as the mobile application or mobile operating system from which the event originated. Rather than terminating evaluation as a result of User A being associated with the first segment, segment evaluator 204 may continue iterating through the remaining events of event history 202 to determine whether there are additional data sources that associate User A to the first segment. For example, the third event may also satisfy the first segment definition. Additional data sources may be tagged or annotated to the data structure representing User A's segmentation information. The annotations may be used to generate different portions of segment cache 208. As a result, segment evaluator may generate, for a user, a data structure comprising a plurality of segments which the user is associated with. Each of these segments may be tagged or annotated with one or more data sources, indicating the data lineage from which the in segment determination was made.

Segment cache 208 may refer to an in-memory data structure that stores segment information for a user. Segment cache may be organized by data sources. For example, segment cache 208 may be organized on a per-data source. A first portion of segment cache may correspond to a restricted data source and include a list of all first party segments derived from the restricted data source. For example, OS_3 as depicted in FIG. 2 may refer to an operating system with a privacy policy that restricts how events gathered from OS_3. The privacy policy may restrict the use of events are gathered from OS_3 environments to first-party use. Accordingly, this portion of segment cache 208 may be omitted for third-party bid requests or other uses that are outside the scope of the privacy policy. If another event with OS_4 environment is restricted based on a different privacy policy, an additional partition or portion of the segment cache may be generated.

A second portion of segment cache 208 may correspond to unrestricted data source (or other data sources) and include a list of first party segments derived from other data sources. Other data sources may refer to unrestricted data sources or any remaining data sources that are not identified as being restricted in a particular manner. Segments may be duplicated in different portions of the segment cache if they can be attributed to a particular segment based on multiple events that were generated from different event sources. For example, if privacy policies prohibit the use of the first portion of the segment cache for a bid request, the unrestricted portion of the segment cache may still be used to determine that the user is in segment or to make other determinations as to the user's shopping and/or spending habits.

A third portion of segment cache 208 may correspond to third-party segments. As depicted in FIG. 2, third-party segments may be grouped together in a single portion. This may arise in scenarios where privacy policies apply to all or none of third-party segments, so that partitioning of third-party segments into multiple portions or partitions is unnecessary.

Segment cache 208 may be used to process bid requests according to various privacy policies. Techniques described in connection with FIG. 3 may utilize segment cache 208. Different bid requests may have different request contexts. As will be described in greater detail below, different portions of segment cache 208 may be queried based on different request contexts according to applicable privacy policies.

Privacy policies may be used to determine how a segment cache is partitioned. For example, each partition may correspond to data lineages that are identified by a privacy policy. In this way, data sources may be segregated based on different applicable privacy policies, such that, for example, Partition_1 corresponds to a first set of data sources that are segregated according to a first set of privacy policies, partition_2 corresponds to a second set of data sources that are segregated according to a second set of privacy policies, and so forth. Finally, there may be a default or unrestricted partition of all remaining data sources that are not subject to any privacy policy. Different privacy policies may be simultaneously applied. For example, a mobile operating system may impose a first privacy policy that restrict data sources to {A, B, C} and a browser may impose a second privacy policy that restricts data sources to {B, C, D}. In at least some embodiments, the resulting privacy policy that is applied to such a browser running on such a mobile operating system may be the intersection of the data sources {B, C}.

Figure 3:
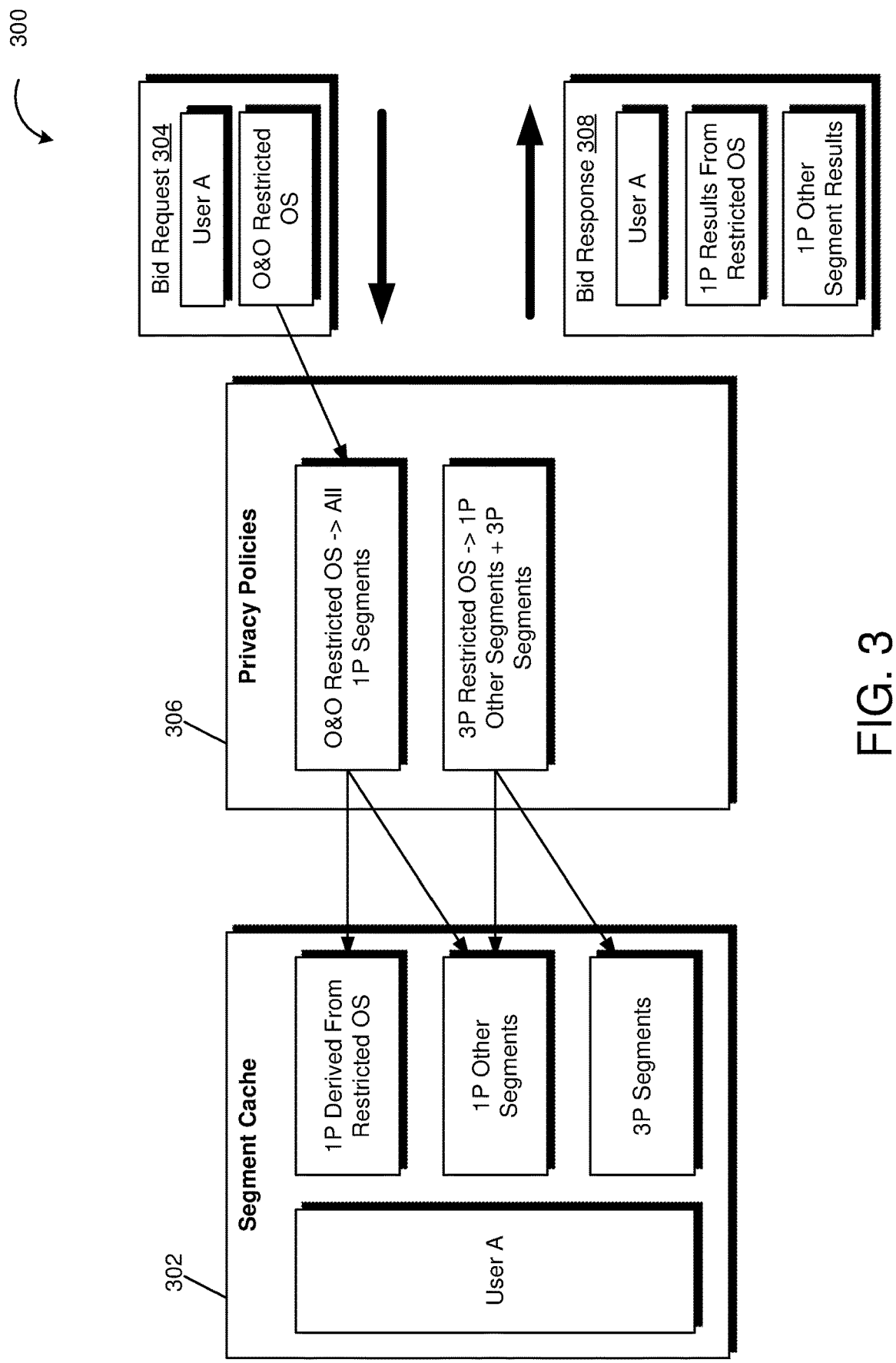
FIG. 3 illustrates a computing environment in which a bid request is processed according to privacy policies, in accordance with one or more example embodiments of the present disclosure.

FIG. 3 illustrates a computing environment 300 in which a bid request is processed according to privacy policies, in accordance with one or more example embodiments of the present disclosure. Techniques described in connection with FIG. 3 may be practiced in the context of embodiments described elsewhere, such as those discussed in connection with FIG. 1, FIG. 3, FIG. 8, FIG. 9, and FIG. 10.

Segment cache 302 may refer to a segment cache that is implemented according to techniques described in connection with FIG. 2. For example, events may be emitted from multiple data sources and aggregated in an event store. Per-user, a segment evaluator may evaluate events to determine whether they meet segment definitions. A data structure may be generated for a user comprising a plurality of segments that are each tagged or annotated with data lineage information. Segment cache 302 may be generated on a per-data source basis so that, all segments that are attributable to a particular data source are grouped together.

Bid request 304 may include information about the impression opportunity including, for example, user data, demographic data, location data, user device data, and so forth. Bid request may encode a user identifier from which the information may be obtained. Bid requests 304 may additionally include additional context information relating to the bid request. For example, the bid request may specify a mobile operating system, mobile application, major or minor versions thereof, etc. for the advertisement. As an example, bid request 304 may be for a first-party mobile application running on a mobile operating system. The version of the operating system may be included in the bid request.

Privacy policies 306 may refer to one or more privacy policies that may be applicable. Bid request 304 may be used to determine which privacy policies are applicable to the particular request. In some cases, zero privacy policies are applicable, in which case segment cache 302 may be used in its entirety. In some cases, multiple privacy policies may be applicable that prevent the use of multiple partitions of segment cache 302. For example, bid request 304 may encode a request context that indicates a privacy policy corresponding to "O&O Restricted OS" is applicable to the request. The privacy policy may be used to identify one or more portions of segment cache 302 that can be used for the request. As depicted in FIG. 3, the "O&O Restricted OS" privacy policy may state that all first-party segments may be used, but not third-party segments. Accordingly, bid request 304 may not rely on or otherwise utilize information from the third-party segments portion of segment cache 302.

Bid request 304 may be processed according to any and all applicable privacy policies 306. One or more portions of segment cache 302 may be used to determine bid response 308. For example, bid response 308 may comprise a user identifier (e.g., corresponding to the user information included in bid request 304) and results determined from various portions of segment cache 302. Bid response 308 may include a response with all first-party segments. In some embodiments, results may be de-duplicated, such as in the case where a user is in market for a segment based on both restricted and unrestricted data sources.

Figure 4:
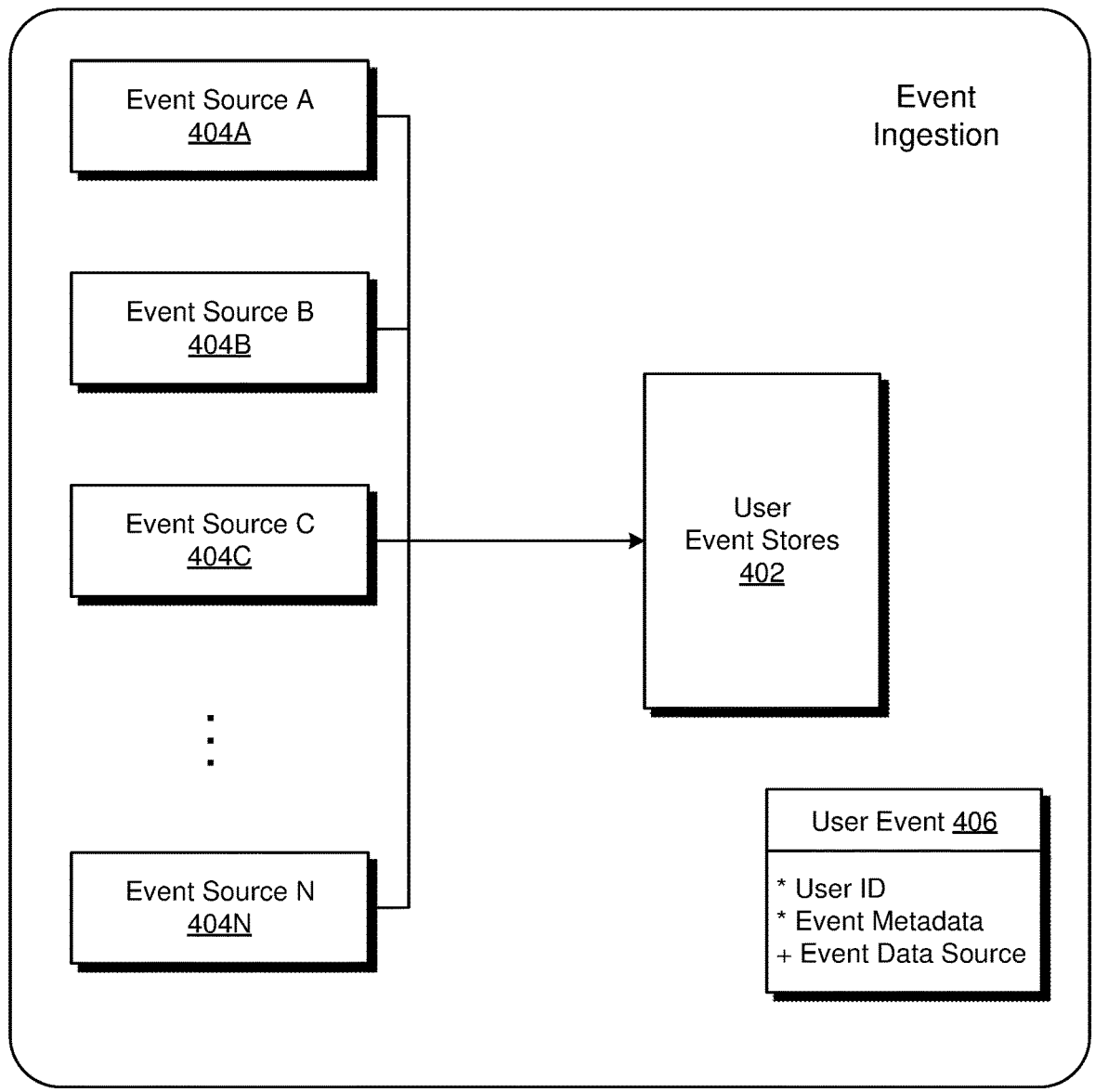
FIG. 4 illustrates a computing environment for implementing an event data store 402, in accordance with one or more example embodiments of the present disclosure.

FIG. 4 illustrates a computing environment 400 for implementing an event data store 402, in accordance with one or more example embodiments of the present disclosure. Techniques described in connection with FIG. 4 may be practiced in the context of embodiments described elsewhere, such as those discussed in connection with FIG. 1, FIG. 8, FIG. 9, and FIG. 10.

Event sources 404A-N may refer to online or offline event sources. Online event sources may refer to event sources that are connected with computer-based actions, such as browsing a website or mobile application. Offline event sources may refer to actions performed offline, such as if a user makes a purchase at a physical (e.g., brick and mortar) store location. Offline actions may be recorded electronically as events and stored in user event store, nevertheless.

User event store 402 may refer to a storage system or service that ingests event data and stores one or more records of user events. User events from across multiple users may be aggregated and stored together. For example, user event store 402 may be implemented at least in part using a persistent data storage system, such as a database system. User event store 402 may comprise a plurality of user event records such as user event 406 depicted in FIG. 4.

User event 406 may refer to a database record or any other suitable data structure for storing event information. For example, user event 406 may comprise a field for a user identifier (user id), event metadata, and event data source. In some embodiments, user agent data is stored within the event data source field of user event 406. User event 406 may store or otherwise encode various online and offline activities that may be used to generate audience-level information to determine segmentation for a user. For example, user event 406 may encode whether a user purchased a product, searched for a product, browsed a product, or performed various other computer-based actions. In some embodiments, user event 406 encodes offline events, such as a user's physical shopping habits.

User event 406 may be decorated with user agent data. For example, user agent information may encode information relating to the data source from which the event originated, which may be used to determine whether privacy policies are applicable to user event 406. For example, if a user event 406 was generated by a mobile application running on a mobile operating system, the operating system name, major and/or minor versions, mobile application identifier, and so forth may be encoded as user agent data. As an example, user agent data may be attached to events conforming to a predefined syntax or structure, such as a Subject-Verb-Object structure of targeting events. This syntax may be used to describe an action (e.g., verb) that was performed by a user (e.g. subject) relating to a product or service (e.g., object). This syntax may include additional optional modifiers, which may be used to attach data lineage information to an event For example, a basic event statement encoded as a Subject-Verb-Object structure may be "User A purchased Pop"—in this illustrative example, "User A" is the subject, "purchased" is the verb, and "Pop" may refer to a particular object or product being purchased. This basic event statement may be decorated or annotated with additional data lineage information, according to at least one embodiment. For example, a more complex event statement with data lineage information may include "User A purchased Pop at time X, through user agent Y, from location Z". The user agent information may be encoded in the event and used to determine how the event may be used by downstream processes, such as whether it may be used to determine segmentation information for the user for a downstream bid request. In various embodiments, user agent data may be attached as predicate expressions whose terms are dimensions of the user agent data, such as User A is in Segment 1 due to (appName=A1) or (os=mobileOS). This may be used to capture arbitrarily complex interactions between event and supply sources without requiring implicit assumptions inside the segment evaluation pipeline.

Another aspect of data sources is whether a segment is first party or third party. This information may come from segment metadata, for example, through a segment data warehouse, and may be attached to an evaluated segment. Accordingly, in various embodiments, if a user belongs to a first party segment because of a first event from a restricted operating system and a second event from an unrestricted operating system, the segment for the user may be "1P and {restricted OS or unrestricted OS}" which can be simplified to "1P and unrestricted."

Figure 5:
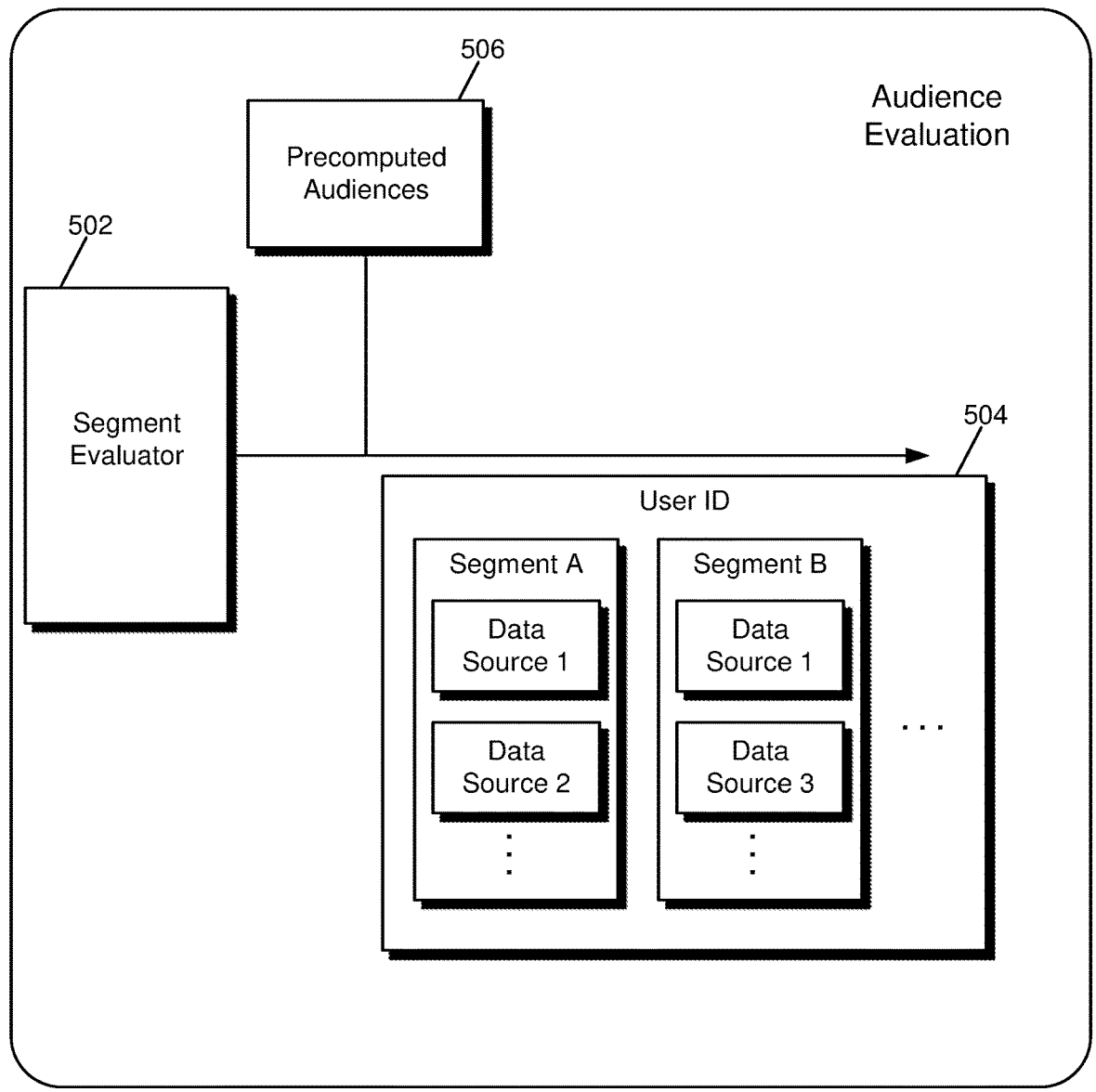
FIG. 5 illustrates a computing environment for implementing a segment evaluator, in accordance with one or more example embodiments of the present disclosure.

FIG. 5 illustrates a computing environment 500 for implementing a segment evaluator 502, in accordance with one or more example embodiments of the present disclosure. Techniques described in connection with FIG. 5 may be practiced in the context of embodiments described elsewhere, such as those discussed in connection with FIG. 1, FIG. 8, FIG. 9, and FIG. 10.

Segment evaluation may be implemented in the context of FIG. 5, according to at least one example embodiment. Segment evaluator 502 may refer to hardware, software, or a combination thereof that performs segment indexing. Segment evaluator may retrieve or otherwise obtain user event data from a user event store, such as those discussed in connection with FIG. 4.

Segment evaluator may process user event data from user event store and generate a data structure comprising a pair of user id and map from segment id to data sources. In various embodiments, rule-based segment evaluation is based on joining the user history (e.g., events and attributes) with a boolean query string. The segment evaluator 502 tracks which events and attributes are responsible for a segment being evaluated to true. In at least one embodiment, segment data lineage is assigned as the union of all events and attributes that put a user in a segment.

For example, user event data may be parsed for a particular user and a data structure 504 may be generated for the user. The data structure 504 may be an in-memory data structure. When an event associated with the user is found, it may be used to determine the user is in a segment. That segment is added to data structure 504, along with data lineage information associated with the event. For example, a first user event from a first data source "Data Source 1" may be responsible for putting the user in "Segment A" as well as a second event from a second data source "Data Source 2". Likewise, the user may be put in "Segment B" based on various event sources, such as "Data Source 1" and "Data Source 3" as an illustrative example. The same user event may be responsible for putting the user in both segments, or different events from the first data source.

Pre-computed audiences 506 (PCA) segment behaves for the purposes of data lineage like an attribute. Audiences, like attributes, may have a key and one or more corresponding values. Each audience may be decorated with data lineage information indicating the data source from which the values originated. For example, pre-computed audiences 506 may be decorated at the user/audience level, populated as a map from audience to list of data sources that will be used by evaluators to decorate audience signal in the user history, and so forth.

Figure 6:
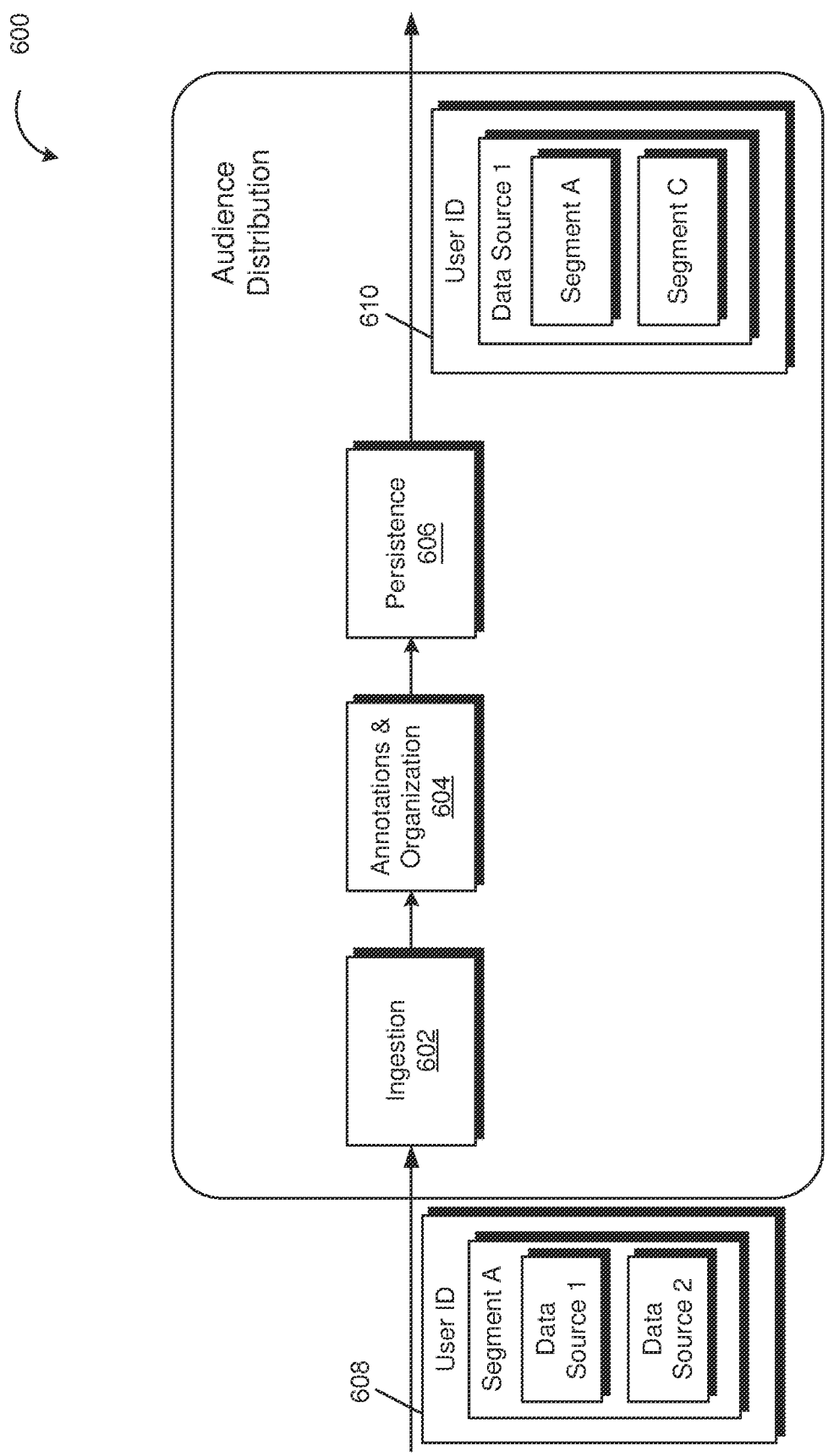
FIG. 6 illustrates a computing environment for implementing audience distribution, in accordance with one or more example embodiments of the present disclosure.

FIG. 6 illustrates a computing environment 600 for implementing audience distribution, in accordance with one or more example embodiments of the present disclosure. Techniques described in connection with FIG. 6 may be practiced in the context of embodiments described elsewhere, such as those discussed in connection with FIG. 1, FIG. 8, FIG. 9, and FIG. 10.

For segment and audience providers, core aggregation may be used to join events from providers together, merging aggregate user events into a single set of data for downstream. Data may be ingested and then annotated and organized in a manner that avoid excessive expansion of the graph space used to represent the event data as more data sources are added. In at least one embodiment, user event data by rotating the event data and re-organizing by data source and a list of segments. In this way, overlapping parts are not repeated. In various embodiment, a set of segments that are common may be store as a base, and for each segment source, a delta to the list, may be added as an incremental update so that only incremental information is stored for additional privacy policies.

Core aggregation may refer to ingestion 602, annotation and organization 604, and persistence 606 stages that form an orchestrator for all segment evaluation pipelines. It may be responsible for ingesting partial user segment memberships, merging them into a single payload, and vending to downstream systems. In at least one embodiment, ingestion 602 stage involves receiving a first data structure 608 for a user that is organized on a per-segment basis where each segment is tagged or annotated with data lineage information. Data structure 608 may include several segments that have been associated with a particular user. First data structure 608 may be generated or determined according to techniques described elsewhere, such as in connection with FIG. 5 above.

Annotation and organization 604 stage may be used to merge into a single payload and vend to downstream systems. For example, data lineage information from first data structure 608 may be parsed, aggregated, and organized, into a single payload. Second data structure 610 may re-organize the event data and data lineage information to a plurality of data sources, wherein each data source is annotated with one or more segments. For example, if the user's inclusion in "Segment A" can be attributed to "Data Source 1" and "Data Source 2" and the user's inclusion into "Segment C" can be attributed to "Data Source "1" then second data structure 610 may include one entry for "Data Source 1" that is annotated with both "Segment A" and "Segment C" and another entry for "Data Source 2" that is annotated with "Segment A." Second data source 610 may be implemented with a map from data source to segment list. One example alternative implementation would be a segment to data source map—this may require less space, at the expense of longer lookups on the data source, which is the expected pattern, as it would involve a scan of the entire list.

To reduce space requirements for a data source-indexed model, assumptions may be made that there is a common segment subset that is allowed for all supply sources, and that there are overlaps among the segment subsets for different supply sources. For example, on a first-party supply source, a user that has both restricted and unrestricted data sources and has given consent on both platforms to use their data for targeting will have identical segment subsets for supply sources from these two platforms. Assuming the above, the data may be organized so that each data source mapping is a delta of another subset. With this assumption, the space of each payload may be optimized by encoding the instructions for compiling the final payload. A shared library may be provided to clients to make compilation transparent.

Figure 7:
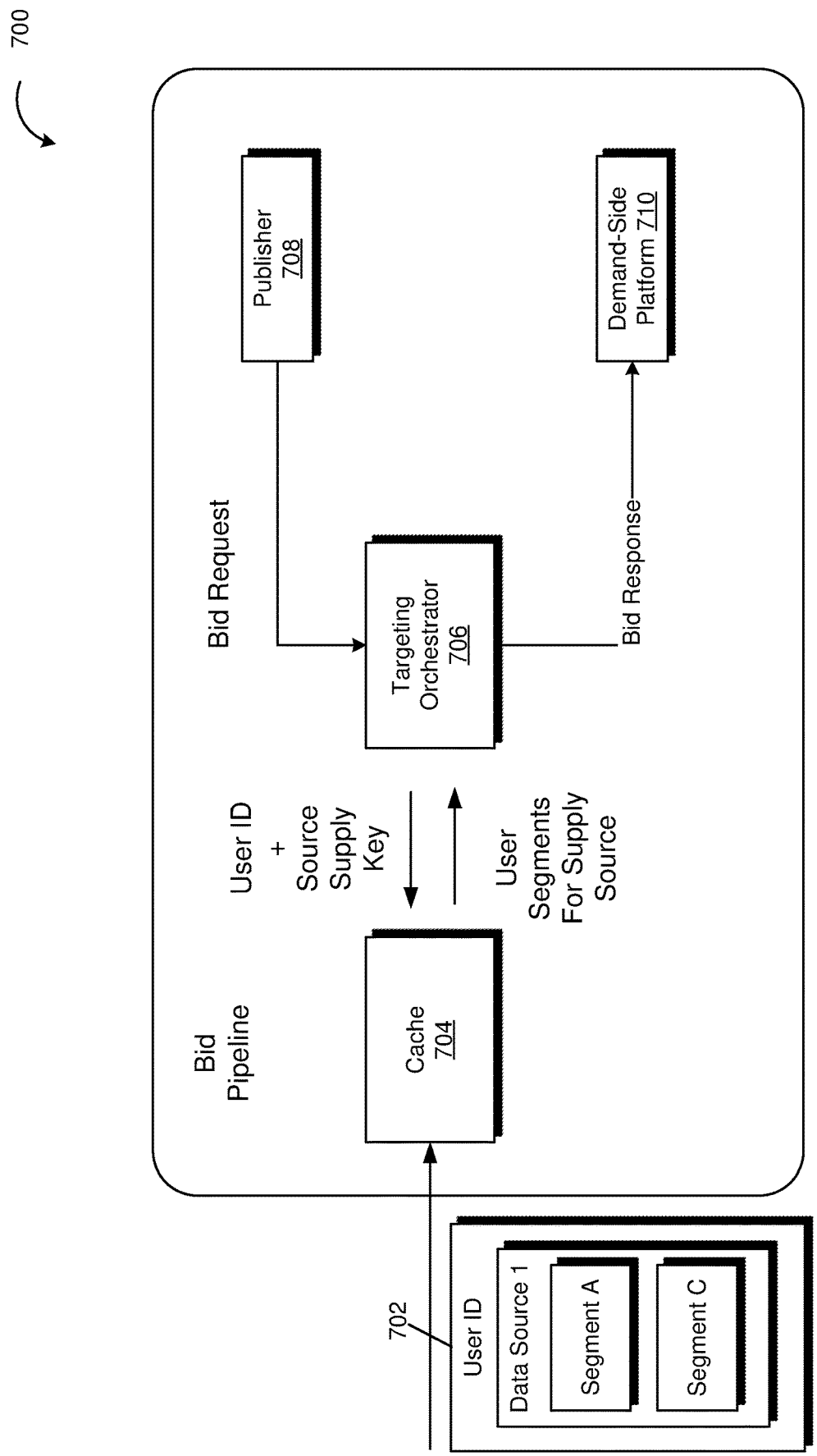
FIG. 7 illustrates a computing environment for implementing a bid pipeline, in accordance with one or more example embodiments of the present disclosure.

FIG. 7 illustrates a computing environment 700 for implementing a bid pipeline, in accordance with one or more example embodiments of the present disclosure. Techniques described in connection with FIG. 7 may be practiced in the context of embodiments described elsewhere, such as those discussed in connection with FIG. 1, FIG. 8, FIG. 9, and FIG. 10.

Data structure 702 may be implemented according to techniques described in connection with FIG. 6. Data structure 702 may be persisted in one or more caches such as cache 704. Cache 704 may be an in-memory cache that is dynamically updated as privacy policies are added, updated, removed, and so forth. To prevent existing cached payloads from being effectively flushed, payloads may be assumed to have all segments under the unrestricted data source.

Targeting orchestrator 706 may be a component implemented as hardware, software, or a combination thereof. Targeting orchestrator 706 may retrieve behavioral segment payloads from cache 704, apply data lineage-to-supply source mapping rules, factoring in user consent status, decorate bids with privacy information that all bidders can use (e.g., opt-out status, impression-unique tokens), and combinations thereof.

Publisher 708 may submit a bid request to targeting orchestrator 706. Bid context (e.g., supply source) may be considered. Bid request may comprise granular information regarding the bid context, such as user identifier and supply source information, such as granular information about where the bid request came from, things like web browser, name of OS, major/minor versions, app from which the bid request originated, etc. Targeting orchestrator 706 may receive user id and supply source key and map the granular information to more summarized information that corresponds to information stored in the cache. The supply source key may be used to determine whether one or more privacy policies restrict the use of event data. For example, targeting orchestrator 706 may determine, based on the bid request, which segments are allowed for use in the bid context and are not marked restricted. For data sources that are restricted or not allowed for use, they may be dropped or omitted from determining the bid request. Different portions of cache 704 may be used. For example, if the bid request came from a first-party source or from a mobile application of a restricted operating system, first-party segments that are not restricted.

Bid response may be generated according to the portions of cache 704 that are available based on privacy policies applicable to bid request. For example, a first bid request from a first mobile application on a restricted mobile operating system platform may be allowed to use a portion of cache 704 that has a data lineage originating from that same mobile application, whereas a second mobile application may be disallowed from using that portion of cache 704. Bid response may be routed to a demand-side platform 710. Demand-side platform 710 may interface with advertisers and may be responsible for managing media content related to advertisements. For example, demand-side platform 710 may maintain a database and/or library of advertisements that each are associated with certain attributes (e.g., context attributes, demographic attributes) and/or may correspond to a specific bid type.

Figure 8:
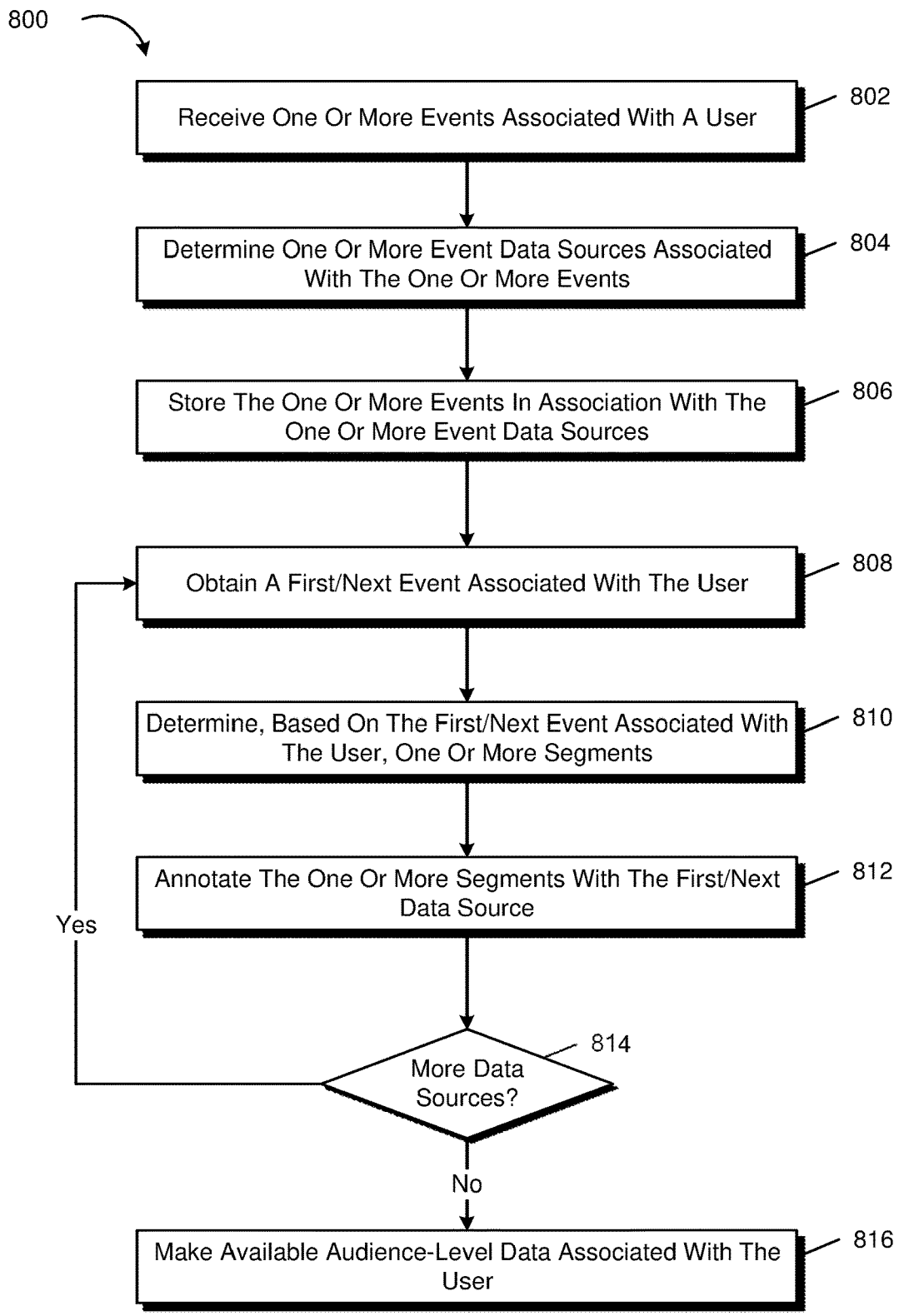
FIG. 8 shows an illustrative example of a process for event ingestion with data lineage information, in accordance with one or more example embodiments of the present disclosure.

FIG. 8 shows an illustrative example of a process 800 for event ingestion with data lineage information, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800 may be implemented in the context of various systems and methods described elsewhere in this disclosure, such as those discussed in connection with FIGS. 1-7 and 10. In at least one embodiment, process 800 or a portion thereof is implemented by a computing resource service provider. Bid request, such as those described in connection with FIG. 9, may be processed in connection with audience-level data generated according to process 800.

In at least one embodiment, process 800 comprises a step to receive 802 one or more events associated with a user. Events may refer to various computer-based actions that can be performed by the user. For example, a user may browse products on a web browser or mobile application, make purchases, add items to a wish list, and so forth. Event data may include various information, such as the action performed (e.g., purchase), the product purchased, when the action occurred, and metadata associated with the event, such as the mobile application that was used to make the purchase, the mobile operating system major and/or minor version numbers, and so forth. The mobile operating system or other components involved in the event may have privacy policies that the event data is subjected to—for example, the mobile operating system may have, as a condition of use, a privacy policy that restricts the use of a "purchase Acme Soda" signal only to first-party (1P) sources from mobile devices running specific versions of the operating system devices. However, if a user buys a bottle of Acme Soda using a mobile application of an operating system and then also buys a bottle of Acme Soda from a desktop computer system that does not have privacy policies that restrict the use of event data, then it may be permissible to target the user based on the "purchase Acme Soda" signal in all supply sources based on the second event, which is unrestricted.

In at least one embodiment, process 800 comprises a step to determine 804 one or more event data sources associated with the one or more events. Event data sources may correspond to data lineage information that encodes how an event signal was generated. For example, event data source may comprise metadata associated with the event, such as the mobile application that was used to perform a computer-based action, the mobile operating system major and/or minor version numbers, and so forth.

In at least one embodiment, process 800 comprises a step to store 806 the one or more events in association with the one or more event data sources. Data lineage information may be recorded and stored along with a user event. For example, a user event store such as those described in connection with FIG. 1 may be used to store both an event signal as well as data lineage information. User event data may be stored as records in a database such that user event records may be retrieved and aggregated at a later point in time.

In at least one embodiment, process 800 comprises a step to obtain 808 a first event associated with the user. The first event may be obtained from a user event store and may be performed at a later point in time from when the event signal was generated. For example, steps 808-814 may be performed in connection with generating a segment cache, such as those described in connection with FIG. 2 and FIG. 3. First event may include or otherwise encode an event data source that indicates a mobile operating system, mobile application, major or minor version information, and so forth, which may be used to determine how privacy policies may affect the ability to use the event data for generating audience-level summary data.

In at least one embodiment, process 800 comprises a step to determine 810, based on the first event associated with the user, one or more segments. A segment evaluator, for example as described in FIG. 2, may be used to determine one or more segments from user event history and one or more segment definitions. The first event may be evaluated in conjunction with one or more segment definitions to determine whether the user is in market for a segment. Segment definitions may refer to rules that determine whether a user is in a segment. Segments may be generated based on various signals from various data sources. For example, a first segment may indicate that it is a first-party segment for purchases of "Pop". Segmentation may be based on a specific product, product category, and so forth. Segments may be more complex, for example, including a time-based restriction so that segmentation is only based on recent or "fresh" signals. Different segments definitions may be specified to identify various audiences for which advertisements or other digital content may be served based on user activities performed online and/or offline.

In at least one embodiment, process 800 comprises a step to annotate 812 the one or more segments with the first data source. In various embodiments, a data structure is generated for the user with one or more segments. Each segment may be mapped to one or more data sources, indicating data lineage of how it was determined that the user is in segment. A segment evaluator may process user event data from user event store and generate a data structure comprising a pair of user id and map from segment id to data sources. In various embodiments, rule-based segment evaluation is based on joining the user history (e.g., events and attributes) with a boolean query string. In at least one embodiment, segment data lineage is assigned as the union of all events and attributes that put a user in a segment.

In at least one embodiment, process 800 comprises a step to determine whether 814 there are more data sources. Steps 808-814 may be repeated for events in a user event store. For example, a second user event may be retrieved from a user event store, the second user event may be used to identify one or more segments, and the one or more segments may be annotated with the second data source. In some cases, the same segment may be annotated with multiple data sources. For example, if the first and second events are associated with different data lineages and both satisfy a segment definition, a segment may be tagged with both data sources.

In at least one embodiment, process 800 comprises a step to make available 816 audience-level data associated with the user. A segment cache may be generated for each of the segment definitions based on a user's history. Segment definitions may be first-party or third-party. User history may be analyzed to determine whether it is in segment based on the segment definitions provided. When an event of user history is determined to satisfy a segment definition, segment evaluator may associate the segment with the user. Additionally, the segment may be annotated with data source information of the event for which the in segment determination was made.

Figure 9:
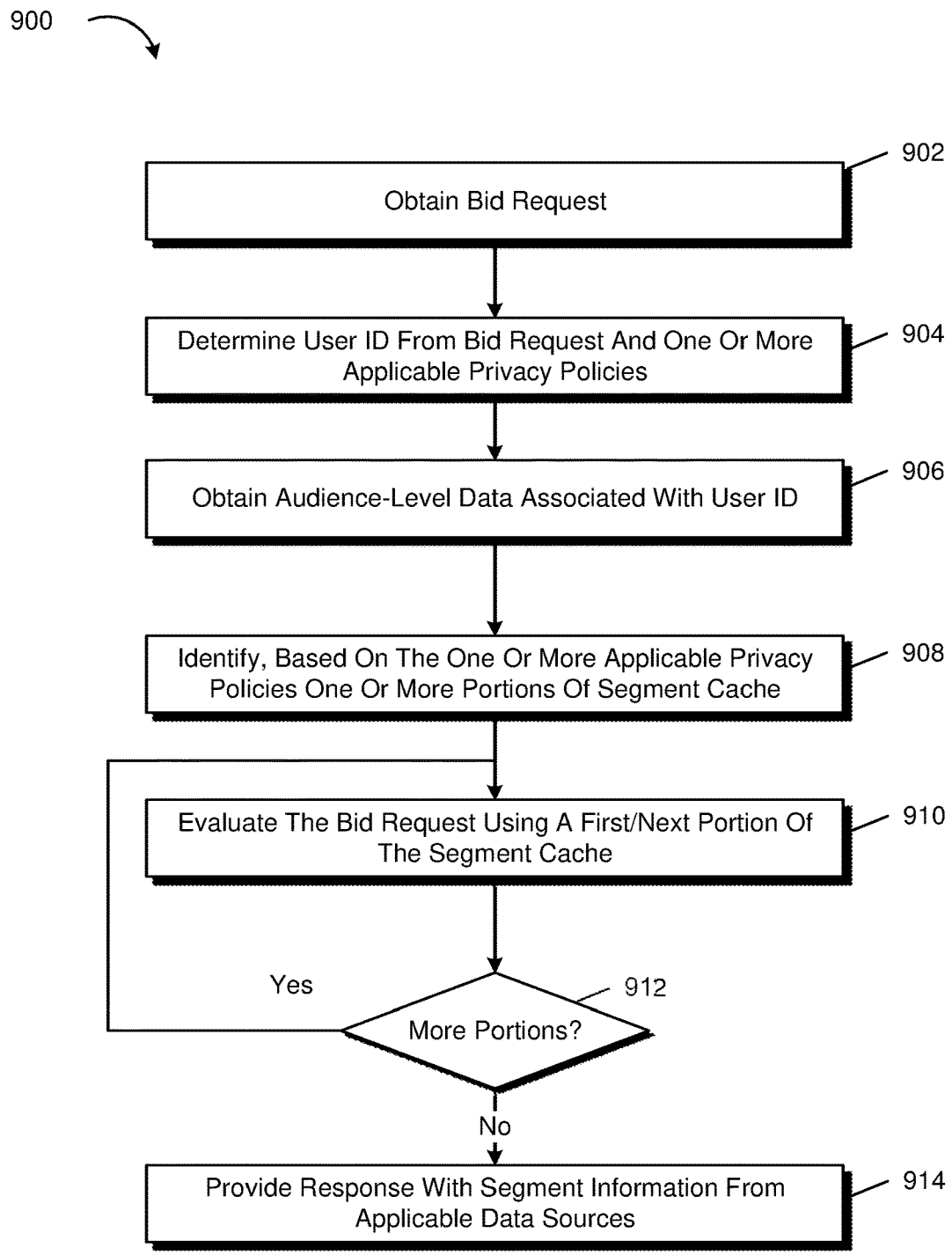
FIG. 9 shows an illustrative example of a process for processing bid requests using end-to-end data lineage information, in accordance with one or more example embodiments of the present disclosure.

FIG. 9 shows an illustrative example of a process 900 for processing bid requests using end-to-end data lineage information, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 900 may be implemented in the context of various systems and methods described elsewhere in this disclosure, such as those discussed in connection with FIGS. 1-7 and 10. In at least one embodiment, process 900 or a portion thereof is implemented by a computing resource service provider. Techniques described in connection with FIG. 8 for event ingestion with data lineage information may be utilized in process 900.

In at least one embodiment, process 900 comprises a step to obtain 902 a bid request. A bid request may be generated and submitted by a publisher. A bid request may encode a bid context and include granular information regarding the bid request, such as a mobile application or browser for which ad content is to be shown, mobile operating system for the bid request, major or minor versions thereof, and so forth.

In at least one embodiment, process 900 comprises a step to determine 904 user ID from the bid request and one or more applicable privacy policies. Applicable privacy policies may be determined from the bid request by performing a lookup using a source supply key. For example, a particular mobile operating system or versions thereof may be In at least one embodiment, process 900 comprises a step to obtain 906 audience-level data associated with the user ID. Audience-level data may be generated using techniques such as those described in connection with FIGS. 1, 2, 6, and 8, for example. Audience-level data may be in the form of a data structure that maps data sources to segments.

In at least one embodiment, process 900 comprises a step to identify 908, based on the one or more applicable privacy policies, one or more portions of a segment cache to utilize to process the bid request. Privacy policies may refer to one or more privacy policies that may be applicable. Bid request may be used to determine which privacy policies are applicable to the particular request. In some cases, zero privacy policies are applicable, in which case segment cache may be used in its entirety. In some cases, multiple privacy policies may be applicable that prevent the use of multiple partitions of segment cache. For example, bid request may encode a request context that indicates a privacy policy corresponding to "O&O Restricted OS" is applicable to the request. The privacy policy may be used to identify one or more portions of segment cache that can be used for the request. The "O&O Restricted OS" privacy policy may state that all first-party segments may be used, but not third-party segments. Accordingly, such a bid request may not rely on or otherwise utilize information from the third-party segments portion of segment cache.

In at least one embodiment, process 900 comprises a step to evaluate 910 the bid request using a first portion of the segment cache. The first portion of the segment cache may be a portion of the segment cache that is associated with a data source that is permitted for use, based on the bid context. For example, if a bid request is from a first mobile application, a portion of the segment cache associated with events collected from the first mobile application may be a permitted source, whereas events collected from an unrelated second mobile application may not be a permitted source. The results of evaluating the bid request for the first portion of the segment cache may be used to determine a subset of the bid response. For example, the first portion may indicate that the user is in segment for {A, C} based on events from a first data lineage.

In at least one embodiment, process 900 comprises a step to determine whether 912 there are more portions. For example, the bid request may be processed using a second portion of the segment cache from a second data source. The second portion may indicate that the user is in segment for {B, C} based on events from the second data lineage. Steps 910-912 may be repeated for each data source that is not excluded based on applicable privacy policies.

In at least one embodiment, process 900 comprises a step to include 914 the first data source in a response. The bid response may be generated with segment information from each of the applicable data sources. For example, if the user is in segment for {A, C} based on events from a first data source and the user is in segment for {B, C} based on events from a source data source, then the union of the sets may be used to generate the response as {A, B, C}. It should be noted that if the user is considered to be in segment for {D} based on a data source that is not permitted for use based on the privacy policies that apply to the bid request, then the response may omit {D} from the bid response.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 10:
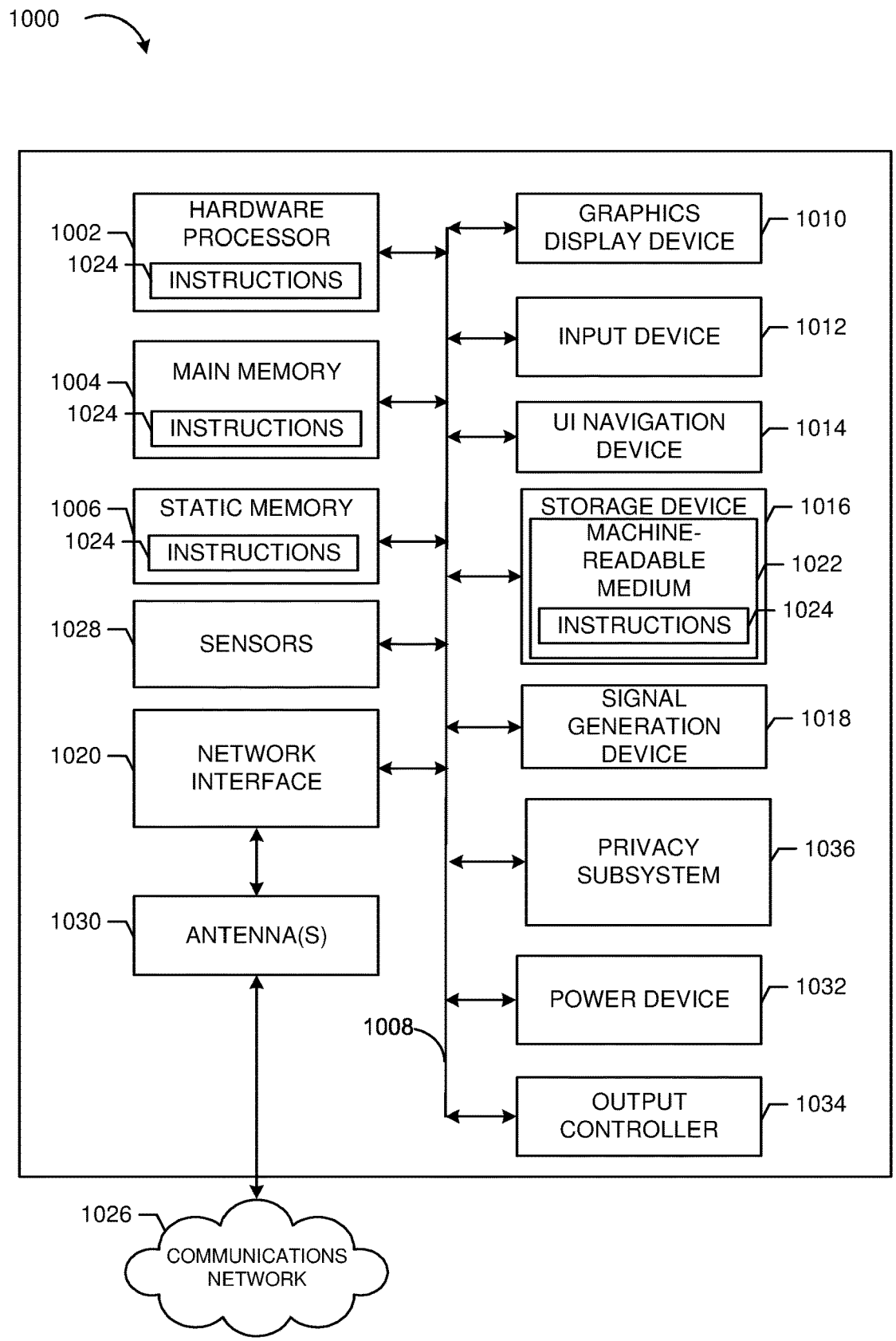
FIG. 10 illustrates a block diagram of an example machine upon which any of one or more techniques (e.g., methods) may be performed, in accordance with one or more example embodiments of the present disclosure.

FIG. 10 illustrates a block diagram of an example of a machine 1000 (e.g., implemented in whole or in part in the context of embodiments described in connection with other figures. In some embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in Wi-Fi direct, peer-to-peer (P2P) (or other distributed) network environments. The machine 1000 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include any combination of the illustrated components. For example, the machine 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (e.g., drive unit) 1016, a signal generation device 1018, and a network interface device/transceiver 1020 coupled to antenna(s) 1030. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

Privacy subsystem 1036 may be used to implement various functionality described in this disclosure, including but not limited to techniques described in connection with FIGS. 1-9. For example, user event stores, segment evaluators, core aggregators, targeting orchestrators, and various other hardware and/or software may be implemented as part of privacy subsystem 1036.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but it can be more when so indicated either explicitly or by context.

What is claimed is:

1. A computer-implemented method, comprising:
determining first event data and second event data associated with a first user, wherein:
the first event data is associated with a first data source; and
the second event data is associated with a second data source;
determining, based on the first event data, the first user is associated with a first segment;
annotating the first segment with first data lineage information comprising the first data source;
determining, based on the second event data, the first user is associated with a second segment;
annotating the second segment with second data lineage information comprising the second data source;
generating a first portion of a segment cache comprising a first mapping of the first data lineage information to the first segment;
generating a second portion of the segment cache comprising a second mapping of the second data lineage information to the second segment;
receiving a first bid request;
determining, from the first bid request, the first user and a first bid context;
determining, based on the first bid context, a first privacy policy is applicable to the first portion of the segment cache;
determining, based on the first privacy policy, that access to the first portion of the segment cache is restricted;
determining, based on the first privacy policy, that access to the second portion of the segment cache is permitted;
determining, based on the second portion of the segment cache, that the first user is associated with the second segment; and
providing a first bid response that includes the second segment.

2. The computer-implemented method of claim 1, further comprising:
receiving a second bid request;
determining, from the second bid request, a second bid context wherein the second bid context indicates a mobile application;
determining, based on the second bid context, the first privacy policy;
determining that the second event data indicates the mobile application;
determining that the first privacy policy permits use of the first portion of the segment cache when a bid request and event data indicate a same mobile application;
determining, based on the first portion of the segment cache, that the first user is associated with the first segment;
determining, based on the first privacy policy, that access to the second portion of the segment cache is permitted;
determining, based on the second portion of the segment cache, that the first user is associated with the second segment; and
providing a second bid response that includes the first segment and the second segment.

3. The computer-implemented method of claim 1, wherein determining, based on the first event data, the first user is associated with the first segment comprises:
determining, a first segment definition; and
determining the first event data satisfies the first segment definition.

4. The computer-implemented method of claim 1, wherein the first data source comprises a first operating system version and the second data source comprises a second operating system version.

5. A system, comprising:
one or more processors; and
memory storing executable instructions that, as a result of execution by the one or more processors, cause the system to:
determine first event data associated with a first user, the first event data comprising a first data source;
determine, based on the first event data, the first user is associated with a first segment;
determine second event data associated with the first user, the second event data comprising a second data source;
determine, based on the second event data, the first user is associated with the first segment;
determine a first mapping that associates the first segment with first data lineage information and second data lineage information, wherein:
the first data lineage information comprising the first data source; and
the second data lineage information comprising the second data source;
determine, based on a first privacy policy, a first portion of a segment cache and a second portion of a segment cache;
generate the first portion of the segment cache based on the first mapping, the first portion comprising a second mapping of the first data source to the first segment; and
generate the second portion of the segment cache based on the first mapping, the second portion comprising a third mapping of the second data source to the first segment.

6. The system of claim 5, wherein executable instructions include further instructions that, as a result of execution by the one or more processors, further cause the system to:
receive a first bid request;
determine, from the first bid request, the first user and a first bid context;
determine, based on the first bid context, the first privacy policy is applicable to the first portion of the segment cache;

determine, based on the first privacy policy, that access to the first portion of the segment cache is restricted;
determine, based on the first privacy policy, that access to the second portion of the segment cache is permitted;
determine, based on the second portion of the segment cache, that the first user is associated with the first segment; and
provide a first bid response that includes the first segment.

7. The system of claim 6, wherein the first bid request is associated with a first operating system and the first event data is associated with a second operating system.

8. The system of claim 6, wherein the first and second portions of the segment cache are generated based on the first privacy policy being added.

9. The system of claim 5, wherein executable instructions include further instructions that, as a result of execution by the one or more processors, further cause the system to:
determine third event data associated with the first user, the third event data comprising the first data source;
determine, based on the third event data, the first user is associated with a second segment;
determine a third mapping that associates the second segment to the first data lineage information; and
wherein the second mapping further maps the first data source to the second segment.

10. The system of claim 5, wherein:
the first portion of the segment cache is associated with one or more privacy policies; and
use of the second portion of the segment cache to process bid requests is unrestricted.

11. The system of claim 5, wherein the segment cache is an in-memory data structure.

12. The system of claim 5, wherein the first privacy policy allows usage of first-party segments and disallows usage of third-party segments.

13. A non-transitory computer-readable storage medium storing executable instructions that, as a result of being executed by one or more processors of a computer system, cause the computer system to at least:
determine first event data associated with a first user, the first event data comprising a first data source;
determine, based on the first event data, the first user is associated with a first segment;
determine second event data associated with the first user, the second event data comprising a second data source;
determine, based on the second event data, the first user is associated with the first segment;
determine a first mapping that associates the first segment with first data lineage information and second data lineage information, wherein:
the first data lineage information comprising the first data source; and
the second data lineage information comprising the second data source;
determine, based on a first privacy policy, a first portion of a segment cache and a second portion of a segment cache;
generate the first portion of the segment cache based on the first mapping, the first portion comprising a second mapping of the first data source to the first segment; and
generate the second portion of the segment cache based on the first mapping, the second portion comprising a third mapping of the second data source to the first segment.

14. The non-transitory computer-readable storage medium of claim 13, wherein the instructions, as a result of being executed by the one or more processors of the computer system, further cause the system to:
receive a first bid request;
determine, from the first bid request, the first user and a first bid context;
determine, based on the first bid context, a first privacy policy is applicable to the first portion of the segment cache;
determine, based on the first privacy policy, that access to the first portion of the segment cache is restricted;
determine, based on the first privacy policy, that access to the second portion of the segment cache is permitted;
determine, based on the second portion of the segment cache, that the first user is associated with the first segment; and
provide a first bid response that includes the first segment.

15. The non-transitory computer-readable storage medium of claim 14, wherein the first event data is comprises an operating system version.

16. The non-transitory computer-readable storage medium of claim 13, wherein the first and second portions of the segment cache are generated based on the first privacy policy being added.

17. The non-transitory computer-readable storage medium of claim 13, wherein the instructions, as a result of being executed by the one or more processors of the computer system, further cause the system to:
determine third event data associated with the first user, the third event data comprising the first data source;
determine, based on the third event data, the first user is associated with a second segment;
determine a third mapping that associates the second segment to the first data lineage information; and
wherein the second mapping further maps the first data source to the second segment.

18. The non-transitory computer-readable storage medium of claim 13, wherein:
the first portion of the segment cache is associated with restricted first-party segments; and
the second portion of the segment cache is associated with unrestricted first-party segments.

19. The non-transitory computer-readable storage medium of claim 13, wherein the first privacy policy allows usage of first-party segments and disallows usage of third-party segments.

20. The non-transitory computer-readable storage medium of claim 13, wherein the first event data and the second event data are persisted in a database.

* * * * *